United States Patent
Wang et al.

(10) Patent No.: US 11,221,412 B2
(45) Date of Patent: Jan. 11, 2022

(54) EYE-SAFE LASER TRIANGULATION MEASUREMENT SYSTEM

(71) Applicant: ANHUI COWAROBOT CO., LTD., Wuhu (CN)

(72) Inventors: Qiang Wang, Wuhu (CN); Runxi Zhang, Wuhu (CN); Tao He, Wuhu (CN); Wenlong Liao, Wuhu (CN); Jianfei Zhang, Wuhu (CN); Lei Zhao, Wuhu (CN); Ding Huang, Wuhu (CN); Liyuan Liu, Wuhu (CN)

(73) Assignee: ANHUI COWAROBOT CO., LTD., Wuhu (CN)

( * ) Notice: Subject to any disclaimer, the term of this patent is extended or adjusted under 35 U.S.C. 154(b) by 550 days.

(21) Appl. No.: 16/302,606

(22) PCT Filed: Apr. 24, 2017

(86) PCT No.: PCT/CN2017/081565
§ 371 (c)(1),
(2) Date: Nov. 16, 2018

(87) PCT Pub. No.: WO2017/198038
PCT Pub. Date: Nov. 23, 2017

(65) Prior Publication Data
US 2019/0170877 A1    Jun. 6, 2019

(51) Int. Cl.
*G01S 17/48*    (2006.01)
*G01S 17/08*    (2006.01)
(Continued)

(52) U.S. Cl.
CPC .............. *G01S 17/48* (2013.01); *G01S 7/484* (2013.01); *G01S 7/4814* (2013.01);
(Continued)

(58) Field of Classification Search
CPC .... G01S 7/4814; G01S 7/4876; G01S 7/4816; G01S 7/497; G01S 7/484; G01S 17/08; G01S 17/48
See application file for complete search history.

(56) References Cited

U.S. PATENT DOCUMENTS 5,999,840 A * 12/1999 Grimson ............... G01B 11/25
600/424
8,085,410 B1 * 12/2011 Hargabus ............... G01B 11/00
356/614
(Continued)

OTHER PUBLICATIONS

International Search Report of PCT/CN2017/081565.
(Continued)

*Primary Examiner* — Sang H Nguyen
(74) *Attorney, Agent, or Firm* — Dragon Sun Law Firm, PC; Jinggao Li, Esq.

(57) ABSTRACT

The present disclosure provides an eye-safe laser triangulation measurement system, including a laser transmitter, an optical projection apparatus, a laser beam capturing unit, a cooperation unit, and an image processing apparatus. The laser transmitter is configured to generate point pulse laser of a pulse laser beam. The optical projection apparatus is disposed at a front end of the laser transmitter, and is configured to convert the point pulse laser into a line laser. The laser beam capturing unit is configured to capture reflected light obtained by the line laser at a target position to obtain a laser image. The cooperation unit is configured to control on and off of the laser transmitter, and control capture of the laser beam capturing unit. The image processing apparatus is configured to perform 3D modeling on the laser image to obtain a distance to the target position.

6 Claims, 4 Drawing Sheets

(51) Int. Cl.
   *G01S 7/481*     (2006.01)
   *G01S 7/497*     (2006.01)
   *G01S 7/487*     (2006.01)
   *G01S 7/484*     (2006.01)

(52) U.S. Cl.
   CPC .......... *G01S 7/4816* (2013.01); *G01S 7/4876* (2013.01); *G01S 7/497* (2013.01); *G01S 17/08* (2013.01)

(56) References Cited

U.S. PATENT DOCUMENTS

| | | | | |
|---|---|---|---|---|
| 2003/0184726 | A1* | 10/2003 | Laurent | G01S 17/48 356/3.07 |
| 2004/0245485 | A1* | 12/2004 | Sari-Sarraf | D06H 3/08 250/559.06 |
| 2014/0192187 | A1* | 7/2014 | Atwell | G01B 11/03 348/136 |
| 2014/0267174 | A1* | 9/2014 | Lin | G06F 3/0428 345/175 |
| 2016/0018526 | A1* | 1/2016 | Van Den Bossche | G01S 7/4802 356/3.11 |
| 2017/0374342 | A1* | 12/2017 | Zhao | G01B 11/2518 |
| 2018/0180408 | A1* | 6/2018 | Du | G01B 11/2522 |

OTHER PUBLICATIONS

Published International Application of PCT/CN2017/081565.
Miscellaneous documents of PCT/CN2017/081565.
Written opinion of PCT/CN2017/081565.

* cited by examiner

EYE-SAFE LASER TRIANGULATION MEASUREMENT SYSTEM

CROSS-REFERENCE TO RELATED APPLICATIONS

This application is a national stage application of PCT Application No. PCT/CN2017/081565. This application claims priority from PCT Application No. PCT/CN2017/081565, filed Apr. 24, 2017, and CN Application No. 201610327604.6, filed May 17, 2016, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates the field of laser measurement, and specifically, to an eye-safe laser triangulation measurement system.

RELATED ART

Currently, there are several ways to perform distance measurement, and ultrasonic ranging and laser triangulation ranging are mainstream ranging methods. The ultrasonic ranging is performed by using ultrasonic waves generated from piezoelectricity or magnetostrictive deformation. An ultrasonic ranging system includes an ultrasonic transmitting apparatus and an ultrasonic receiving apparatus. The ultrasonic transmitting apparatus emits ultrasonic waves. Ultrasonic waves are reflected when encountering an obstacle or a target in a propagation process, and finally are received by the ultrasonic receiving apparatus. A distance can be calculated by using an ultrasonic propagation speed and time required for ultrasonic propagation. However, due to diffuse reflection of the ultrasonic waves on a surface or a curved surface, the measurement accuracy is affected. In addition, an ultrasonic ranging apparatus has a low anti-interference ability and is easily affected by wind or other natural factors.

Laser raging is another ranging manner. According to different physical information used, the laser ranging may be performed in many manners. Some laser measurement systems use phase changes of reflected waves to perform distance measurement, and some use pulses to perform measurement. For the laser measurement using pulses, a round trip time in a laser propagation process is used to perform distance measurement.

In the laser triangulation ranging, a laser, a target point and a laser receiving apparatus are placed at three points. The laser emits a laser beam, then the laser beam is reflected by the target point and is eventually received by the laser receiving apparatus. After the laser receiving apparatus receives the laser beam, a distance is calculated according to a laser triangulation ranging rule. In addition, the laser has a large emission power, which is harmful to human eyes. Meanwhile, a receiving sensor requires high sensitivity for convenience of receiving laser signals. This increases device costs.

SUMMARY

For defects in the prior art, an objective of the present disclosure is to provide an eye-safe laser triangulation measurement system.

The eye-safe laser triangulation measurement system provided according to the present disclosure includes a laser transmitter, an optical projection apparatus, a laser beam capturing unit, a cooperation unit, and an image processing apparatus, where the laser transmitter is configured to generate point pulse laser of a pulse laser beam;

the optical projection apparatus is disposed at a front end of the laser transmitter, and is configured to convert the point pulse laser into line laser;

the laser beam capturing unit is configured to capture reflected light obtained by the line laser at a target position to obtain a laser image;

the cooperation unit is configured to control on and off of the laser transmitter, and control capture of the laser beam capturing unit; and the image processing apparatus is configured to perform 3D modeling on the laser image to obtain a distance to the target position.

Preferably, the laser transmitter includes a laser diode, a constant current source, and a protective circuit. The constant current source receives triggering by a trigger signal of the cooperation unit and turns off after a turn-on time $T_{on}$. When the constant current source is within the turn-on time, the laser diode generates the point pulse laser, where the protective circuit is configured to control the turn-on time $T_{on}$ to be less than a predetermined threshold.

Preferably, the laser beam capturing unit is a photographic camera, and a narrowband bandpass filter is provided at a front end of a camera of the photographic camera. A central wavelength of the narrowband bandpass filter is the same as a wavelength of laser emitted by the laser transmitter, that is, the narrowband bandpass filter is capable of filtering out effects of most natural light on the system.

Preferably, the cooperation unit generates a pulse control signal to control opening and closing of a shutter of the photographic camera, and control on and off of the laser transmitter. Specifically, a laser transmitter generates laser according to a switching interval of the shutter of the photographic camera, that is, every two times the shutter is opened, the laser transmitter generates laser. Because a time interval between pulse control signals is short, a background difference between two consecutive laser images is small, and laser point pixels can be extracted from background pixels by comparing the two consecutive laser images.

Preferably, the image processing apparatus further performs filtering processing and laser line extraction on a laser image, and performs 3D modeling on the extracted laser line.

Preferably, the protective circuit controls the turn-on time $T_{on}$ to be less than 50 μs by using a timer timing manner and a hardware circuit timing manner.

Preferably, an output power of the laser diode is 200 mW.

Compared with the prior art, the present disclosure has the following beneficial effects:

1. The present disclosure adopts the line laser for triangulation measurement, which can avoid apparatus scanning costs brought by point-by-point laser scanning and improve system stability.

2. The present disclosure adopts a short-pulsed working mode and the line laser to project the laser, which can achieve a low average power of the system and a large laser beam diffusion angle, and can effectively prevent the laser from causing any harm to human eyes.

3. The present disclosure adopts a method based on a narrowband filter and background modeling, which can effectively extract laser lines and restrain noise interference, so that the system can operate under sunlight.

BRIEF DESCRIPTION OF THE DRAWINGS

Other features, objectives and advantages of the present disclosure will become more apparent by reading a detailed description of non-restrictive embodiments provided with reference to the accompanying drawings.

DETAILED DESCRIPTION

The present disclosure is described in detail below with reference to specific embodiments. The following embodiments will help a person skilled in the art to further understand the present disclosure, but are not intended to limit the present disclosure in any form. It should be noted that those of ordinary skill in the art can further make various variations and modifications without departing from the conception of the present disclosure. All these shall fall within the protection scope of the present disclosure.

An eye-safe laser triangulation measurement system provided according to the present disclosure includes a laser diode configured to emit point laser, an optical projection apparatus converting the point laser into line laser, a laser beam capturing unit configured to capture a reflected laser beam, a cooperation unit configured to control an exposure time of a laser and an image unit to enable the two to cooperate with each other, and an image analyzer configured to perform 3D modeling on a captured image. The laser diode is provided with a laser protection circuit configured to ensure a turn-on time of the laser is 10 μs plus or minus 2 μs to ensure safety of human eyes. The laser diode emits the point laser that is converted by the optical projection apparatus into the line laser, rather than using a line laser transmitter, thereby reducing costs. The laser protection circuit includes hardware protection and software protection. The software protection can monitor pulse signals to ensure that a conducting time of the laser is 10 μs. The hardware protection ensures that a conducting time of the pulse laser is 10 μs by using the protective circuit, and that the conducting time of the laser is protected by hardware when the software protection does not work. A microcontroller controls opening and closing of a camera shutter. When the shutter is opened, the cooperation unit generates a trigger signal for turning on the laser, and reflected laser is captured by the camera and a distance is calculated. A front end of the image unit is equipped with a narrowband bandpass filter for filtering out effects of natural light on the system.

Figure 1:
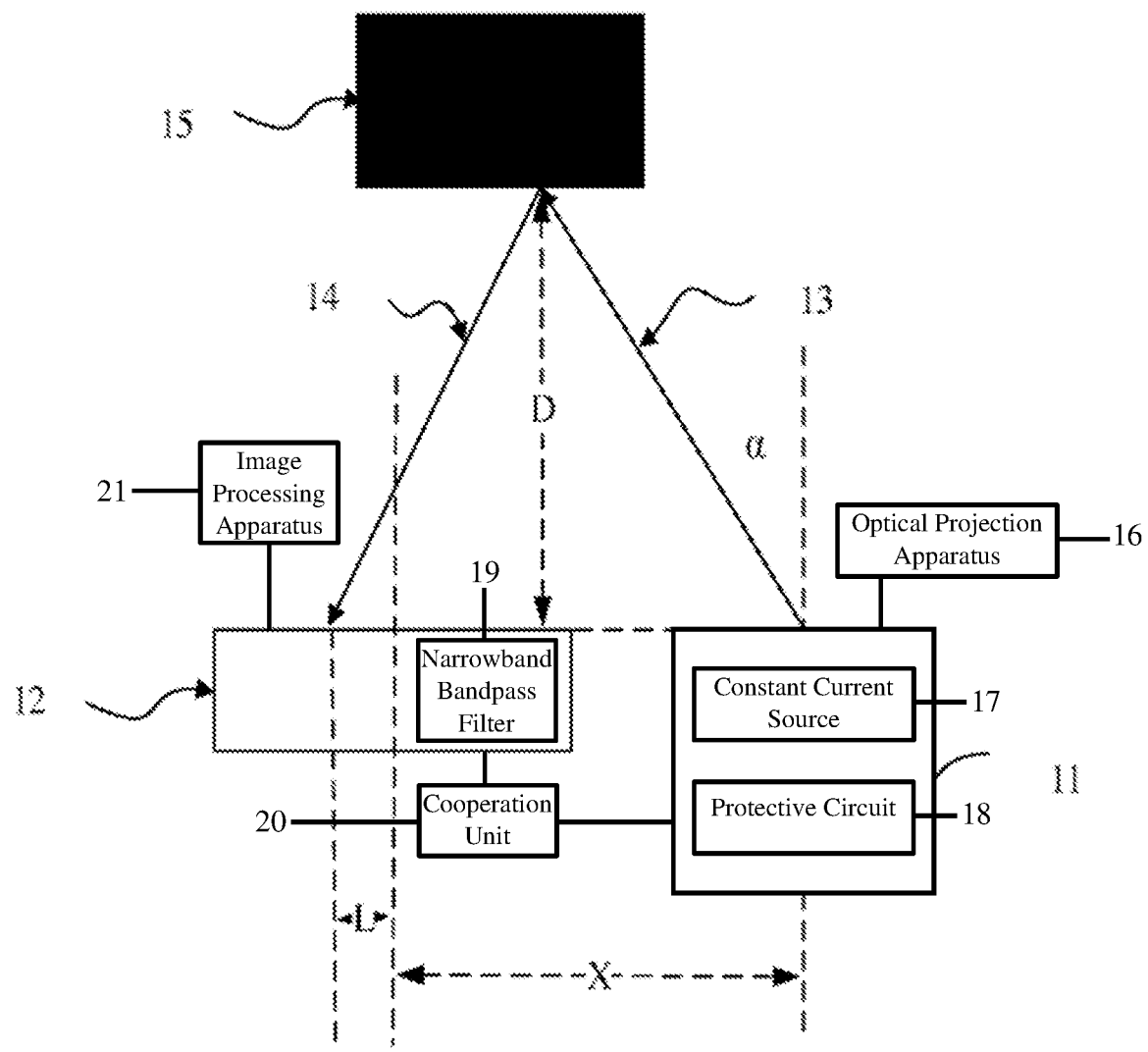
FIG. 1 is a principle diagram of measuring a distance between a target point and an apparatus according to the present disclosure.

As shown in FIG. 1, a laser transmitter 11 generates point laser. To convert the point laser into line laser 13, optical projection apparatus 16 is placed on the laser transmitter. Through projection by optical projection apparatus 16, the point laser is converted into the line laser 13. Since a point laser transmitter is cheaper than a line laser transmitter, costs of a system are reduced. Line laser 13 is reflected when encountering an obstacle 15, and reflected light 14 is received by a photographic camera 12. A distance D can be calculated by recording a laser propagation time. Narrowband bandpass filter 19 is provided at a front end of a camera of photographic camera 12. Due to unidirectionality and high-brightness of the laser, a central wavelength of narrowband bandpass filter 19 is the same as a wavelength of the laser, thereby filtering out effects of most natural light on the system. The laser beam emitted by a laser has a wavelength of 808 nm, the central wavelength of narrowband bandpass filter 19 is also 808 nm and a bandpass width is 20 nm. Image processing apparatus 21 is configured to perform 3D modeling on the laser image to obtain a distance to the target position. Laser transmitter 11 includes a laser diode, constant current source 17, and protective circuit 18.

Cooperation unit 20 is configured to control the laser transmitter to generate the laser beam, and control the camera to acquire a laser image. The acquired image is processed by a processing unit to obtain an accurate position of the laser beam on the image. A distance calculation and storage apparatus performs calculations and stores a distance.

Figure 2:
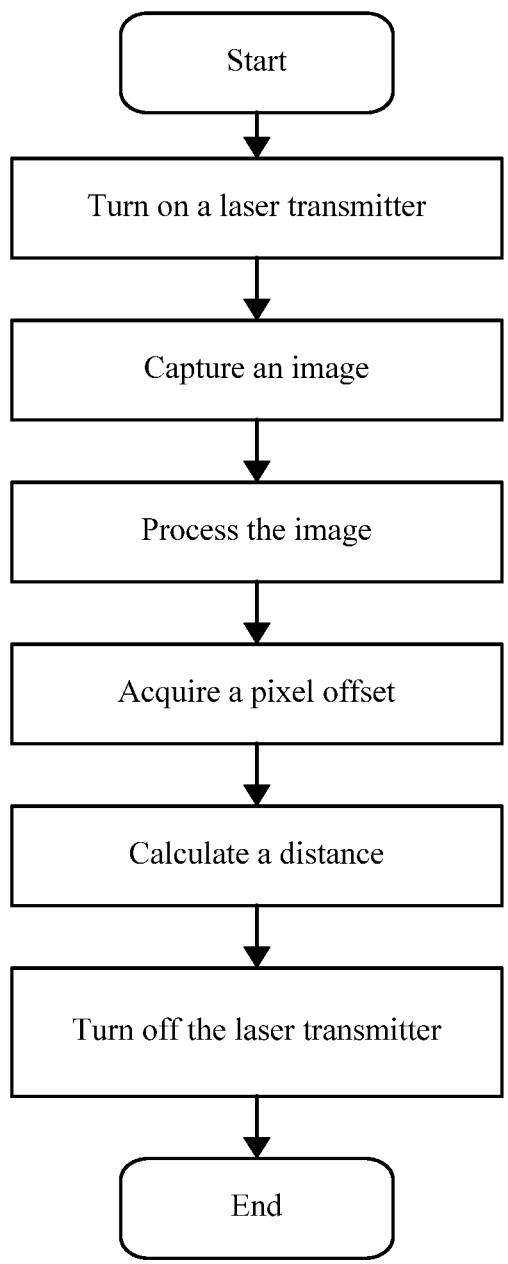
FIG. 2 is a schematic diagram of a testing process of a system according to the present disclosure.

As shown in FIG. 2, the laser transmitter emits the laser beam, the laser beam is reflected at a target position, and finally is captured by the photographic camera. After an image processing is performed on the captured image, a position of a laser point in the image can be obtained. A distance to the target point can be calculated according to an offset position of the laser point.

Figure 3:
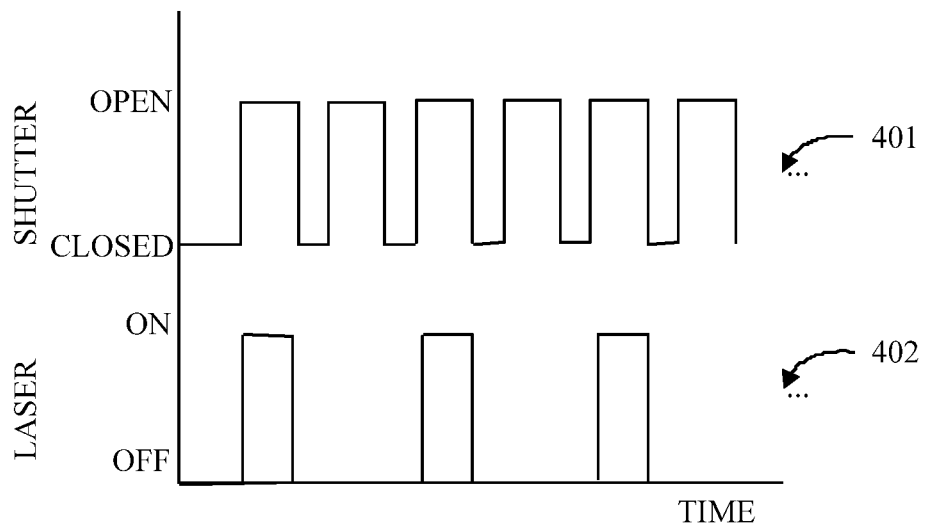
FIG. 3 is a sequence diagram of a coordinated control image unit and a laser transmitter unit.
Figure 4:
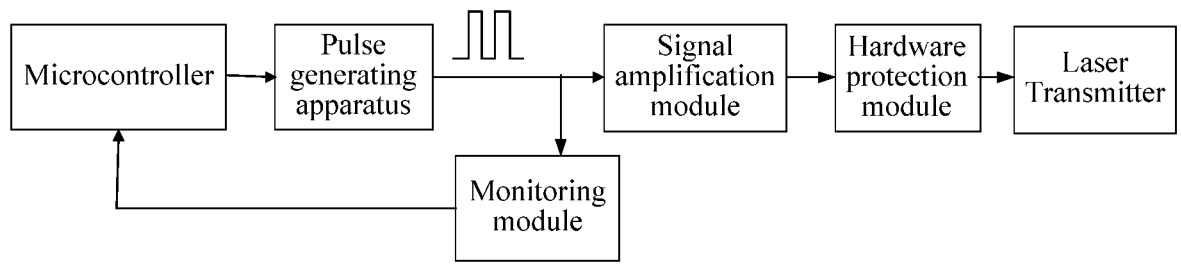
FIG. 4 is a structural diagram of a laser drive circuit.

As shown in FIG. 3 and FIG. 4, FIG. 3 is a sequence diagram of a coordinated control image unit and a laser transmitter unit. An opening time of the shutter is longer than a conducting time of the laser diode. A pulse generator generates a pulse signal, and the pulse signal is propagated in two ways. Signal amplification is performed on a control image unit signal 401 by an amplification module, to drive the laser diode to emit a laser beam. A hardware protection module is disposed between the laser diode and an amplifier circuit. This module is further configured to ensure pulse duration, thereby ensuring safety of human eyes. A laser transmitter unit signal 402 is input to a monitoring module. The monitoring module times. Once the pulse duration exceeds a threshold, the monitoring module alarms and turns off a pulse transmission module.

The hardware protection circuit includes an integrator and an overcurrent protection circuit. If an output voltage of the integrator exceeds a reference voltage, a switch of the laser diode is opened, so that the laser diode is turned off.

In the present disclosure, the eye-safe laser is ensured by a switching driving circuit. A laser protection circuit is divided into hardware protection and software protection.

Figure 5:
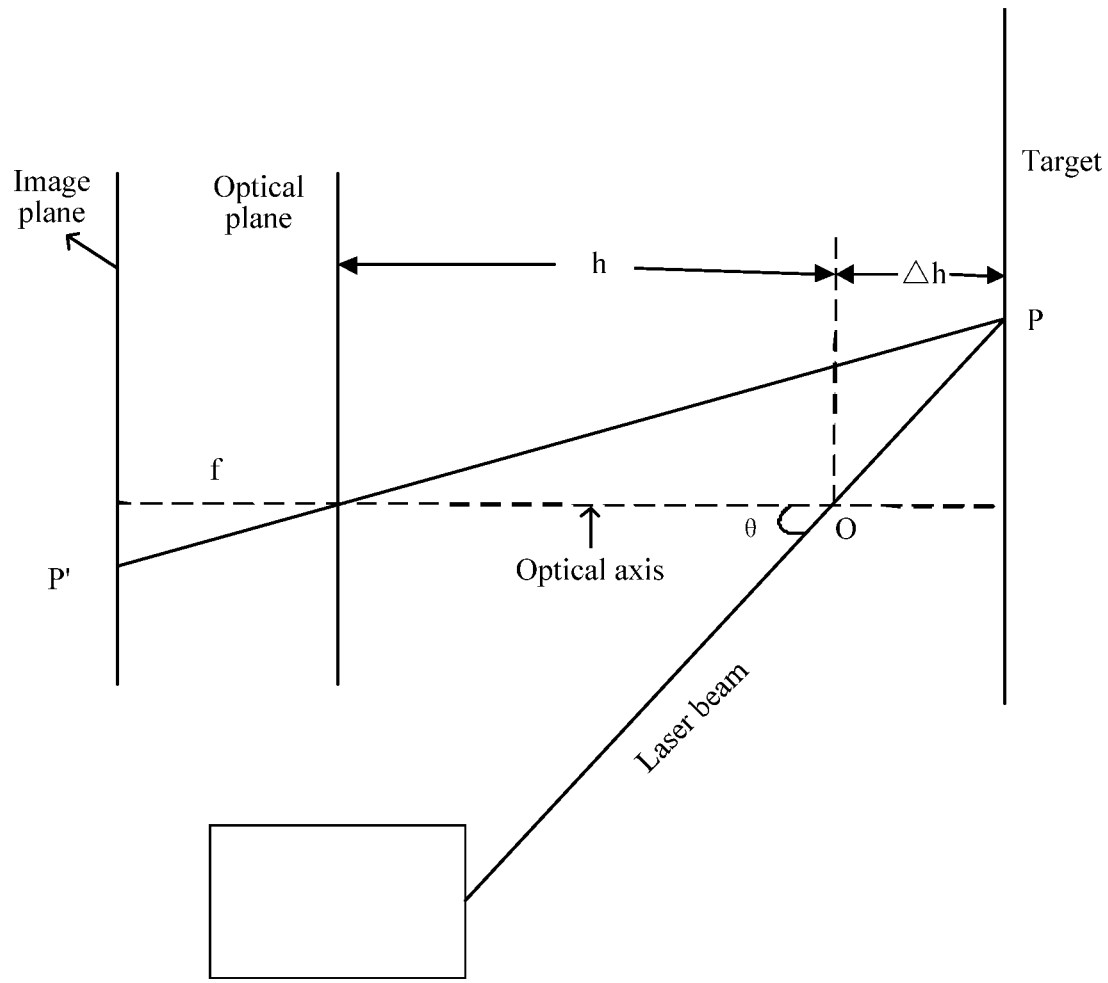
FIG. 5 is a diagram of a position relationship between a laser beam and a camera.

As shown in FIG. 5, an angle between a laser beam and an optical axis of a photographic camera is θ, and an intersection point is O. The laser beam is projected onto an obstacle, to form a point P. P' is a mirror image of the point P. A vertical distance from the point O to an optical center plane is h, and a vertical distance from the point P to the point O is Δh. v is a distance from the point V to a u-axis of an imaging plane, and z is a vertical distance from the point P to the optical center plane. A focal distance of the camera is f. Therefore:

$$z = \frac{hf\tan\theta}{f\tan\theta + v}$$

Figure 6:
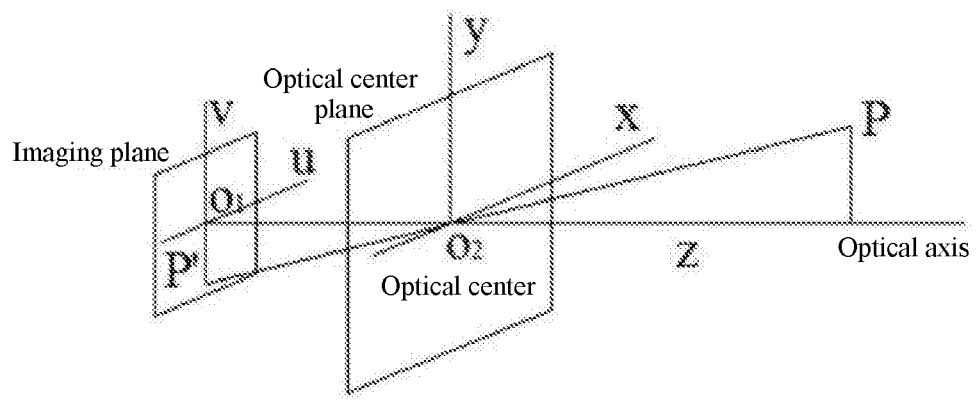
FIG. 6 is a schematic diagram of a relationship between an x-axis coordinate and a y-axis coordinate of a point P.

According to FIG. 6, an x-axis coordinate and a y-axis coordinate of the point P can be calculated by using the following geometric relationship:

$$x = \frac{-h\tan\theta}{f\tan\theta + v}v$$

$$y = \frac{-h\tan\theta}{f\tan\theta + v}u$$

The specific embodiments of the present disclosure are described above. It should be understood that the present disclosure is not limited to the foregoing specific implementations, and a person skilled in the art can make various variations and modifications within the scope of the claims, which does not affect the essence of the present disclosure.

What is claimed is:

1. An eye-safe laser triangulation measurement system, comprising:
    a laser transmitter;
    an optical projection apparatus;
    a laser beam capturing unit;
    a cooperation unit; and
    an image processing apparatus, wherein
    the laser transmitter is configured to generate point pulse laser of a pulse laser beam;
    the optical projection apparatus is disposed at a front end of the laser transmitter, and is configured to convert the point pulse laser into a line laser;
    the laser beam capturing unit is configured to capture reflected light obtained by the line laser at a target position to obtain a laser image;
    the cooperation unit is configured to control on and off of the laser transmitter, and control capture of the laser beam capturing unit; and
    the image processing apparatus is configured to perform 3D modeling on the laser image to obtain a distance to the target position;
    wherein the laser transmitter comprises a laser diode, a constant current source, and a protective circuit, wherein
    the constant current source receives triggering by a trigger signal of the cooperation unit and turns off after a turn-on time $T_{on}$;
    when the constant current source is within the turn-on time, the laser diode generates the point pulse laser; and
    the protective circuit is configured to control the turn-on time $T_{on}$ to be less than a predetermined threshold.

2. The eye-safe laser triangulation measurement system according to claim 1, wherein
    the laser beam capturing unit is a photographic camera, and a narrowband bandpass filter is provided at a front end of a camera of the photographic camera; and
    a central wavelength of the narrowband bandpass filter is the same as a wavelength of laser emitted by the laser transmitter, the narrowband bandpass filter being capable of filtering out effects of most natural light on the system.

3. The eye-safe laser triangulation measurement system according to claim 2, wherein
    the cooperation unit generates a pulse control signal to control opening and closing of a shutter of the photographic camera, and control on and off of the laser transmitter;
    a laser transmitter generates laser according to a switching interval of the shutter of the photographic camera, so that every two times the shutter is opened, the laser transmitter generates laser; and
    because a time interval between pulse control signals is short, a background difference between two consecutive laser images is small, and laser point pixels can be extracted from background pixels by comparing the two consecutive laser images.

4. The eye-safe laser triangulation measurement system according to claim 1, wherein the image processing apparatus further performs filtering processing and laser line extraction on the laser image, and performs 3D modeling on the extracted laser line.

5. The eye-safe laser triangulation measurement system according to claim 1, wherein the protective circuit controls the turn-on time Ton to be less than 50 μs by using a timer timing manner and a hardware circuit timing manner.

6. The eye-safe laser triangulation measurement system according to claim 1, wherein an output power of the laser diode is 200 mW.

* * * * *